(12) United States Patent
Schmandt et al.

(10) Patent No.: US 8,656,242 B2
(45) Date of Patent: Feb. 18, 2014

(54) DATA RECEIVING DEVICES AND METHODS FOR RECEIVING DATA

(75) Inventors: Bernd Schmandt, Wuppertal (DE);
Christian Ewert, Muelheim (DE);
Thorsten Tracht, Munich (DE); Irene Schuster, Kronstorf (AT)

(73) Assignee: Intel Mobile Communications GmbH, Neubiberg (DE)

( * ) Notice: Subject to any disclaimer, the term of this patent is extended or adjusted under 35 U.S.C. 154(b) by 309 days.

(21) Appl. No.: 13/080,727

(22) Filed: Apr. 6, 2011

(65) Prior Publication Data
US 2012/0257517 A1    Oct. 11, 2012

(51) Int. Cl.
*G08C 25/02* (2006.01)
*H04L 12/56* (2011.01)
(52) U.S. Cl.
USPC .......................................... 714/748; 370/394

(58) Field of Classification Search
USPC ................. 370/350, 503, 394, 400, 329, 351, 370/395.21, 216–218, 242, 244, 245, 247; 714/746, 748, 749, 750
See application file for complete search history.

(56) References Cited

U.S. PATENT DOCUMENTS

| 5,170,391 A | 12/1992 | Arnold et al. | |
|---|---|---|---|
| 5,872,777 A * | 2/1999 | Brailean et al. | 370/349 |
| 2009/0122796 A1* | 5/2009 | Garcia et al. | 370/389 |

* cited by examiner

*Primary Examiner* — Hanh N Nguyen

(57) ABSTRACT

According to an embodiments, a device may be provided. The device may include a data receiver configured to receive data in sets of consecutive packets from a data transmitter, wherein each set may include a first packet and at least one further packet. The device may further include a first packet reception determinator configured to determine whether the first packet of a set of consecutive packets is received by the data receiver. The device may further include a data sending determinator configured to determine whether the data transmitter sends the set of consecutive packets based on whether the first packet of the set of consecutive packets is received.

30 Claims, 5 Drawing Sheets

FIG 3

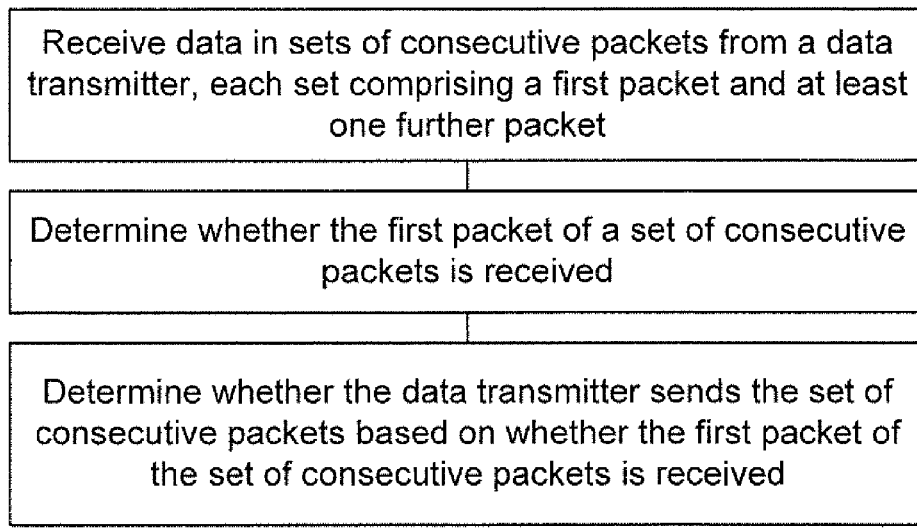

- 302: Receive data in sets of consecutive packets from a data transmitter, each set comprising a first packet and at least one further packet
- 304: Determine whether the first packet of a set of consecutive packets is received
- 306: Determine whether the data transmitter sends the set of consecutive packets based on whether the first packet of the set of consecutive packets is received

FIG 4

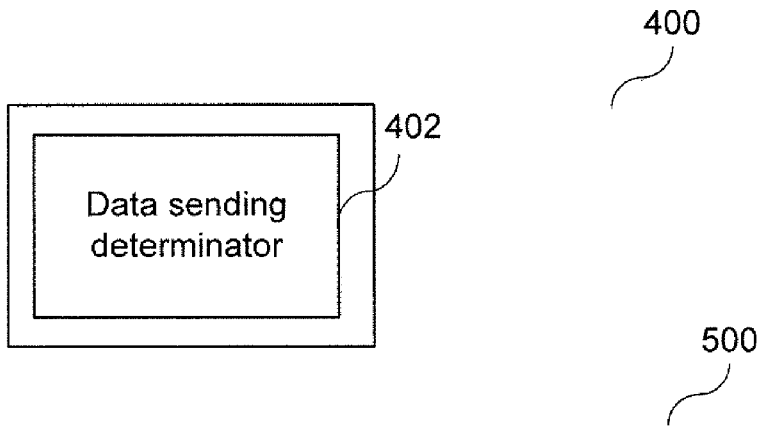

- 402: Data sending determinator

FIG 5

- 502: Determine whether a data transmitter sends a set of consecutive packets, each set comprising a first packet and at least one further packet, based on whether the first packet of the set of consecutive packets is received

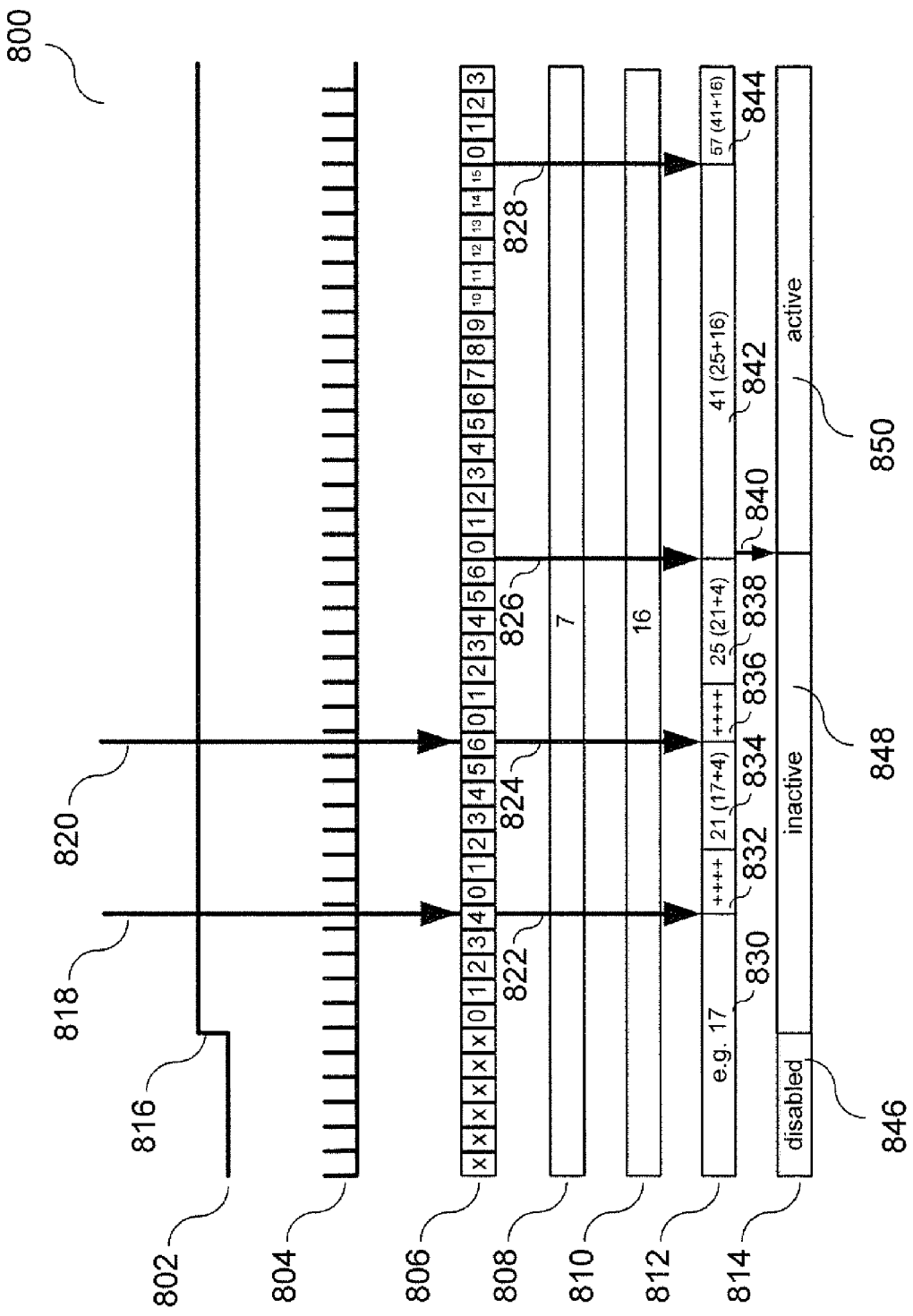

DATA RECEIVING DEVICES AND METHODS FOR RECEIVING DATA

TECHNICAL FIELD

Embodiments relate generally to data receiving devices and methods for receiving data.

BACKGROUND

In various communication systems, the interface between a transmitter and a receiver may be based on a packet oriented link. In order to keep the transmitter and receiver synchronized, in commonly used systems, after a period of time where no data is to be transmitted, synchronization may be established anew, or dummy data may be sent even if no useful data is to be transmitted, in order not to have to establish synchronization anew.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a flow diagram illustrating a method in accordance with an embodiment;
FIG. 4 shows a device in accordance with an embodiment;
FIG. 5 shows a flow diagram illustrating a method in accordance with an embodiment;
FIG. 8 shows a diagram illustrating a method in accordance with an embodiment.

DESCRIPTION

Figure 1:
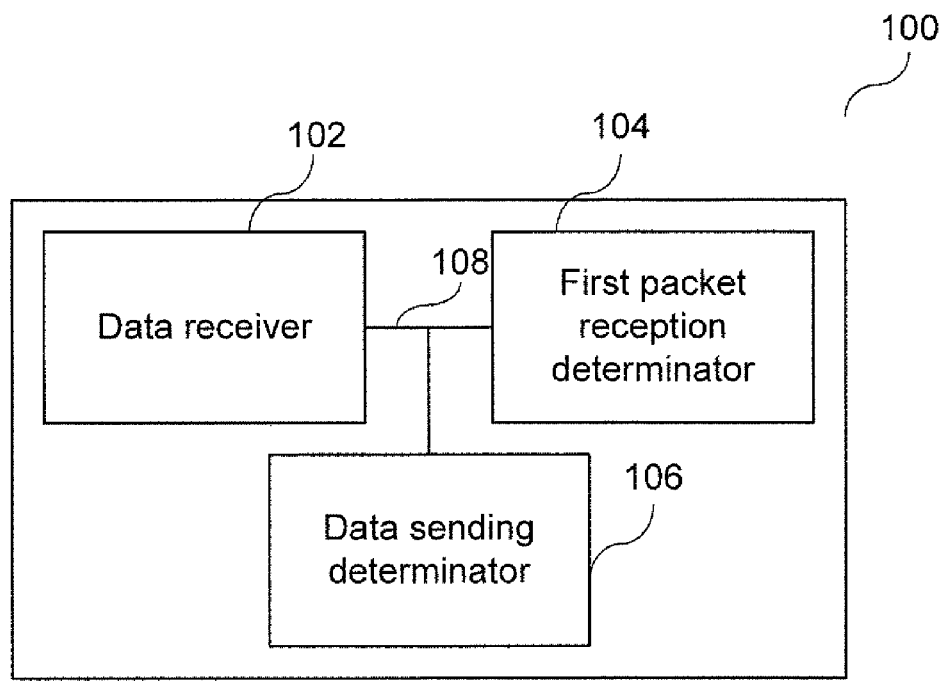
FIG. 1 shows a device in accordance with an embodiment.

In various communication systems, the interface between a transmitter and a receiver may be based on a packet oriented link. In order to keep the transmitter and receiver synchronized, in commonly used systems, after a period of time where no data is to be transmitted, synchronization may be established anew, or dummy data may be sent even if no useful data is to be transmitted, in order not to have to establish synchronization anew.

In commonly used methods, the sample stream may be kept alive even in cases where no samples are required by the baseband. For power saving reasons most of the receive path and the transceiver may be switched off in this case. Only parts of the sample generation unit may be desired to be active in this state. The other parts may be used for other purposes or they may be switched off for power saving reasons. In this state only a dummy sample stream may be propagated to the baseband. To restart the sample stream, a restart command may be sent by the baseband to the transceiver. As a response, the transceiver may start to send valid samples to the baseband again. The transceiver may be responsible to put the valid samples at the correct position in the running sample stream. According to this method, no restart of the sample stream may be desired. Instead, the old stream timing may be used and the new samples may be placed at the correct position in this stream. According to this method, the dummy stream may have to be kept alive on the interface, for example a DigRF interface. Furthermore, the dummy traffic may use bandwidth on the bus which may be desired for other purposes (e.g. for measurements on a different RAT (radio access technology)), the dummy traffic may increase the power consumption on the link, for example the DigRF Link, and, when changing the configuration of the interface, for example the DigRf interface, no dummy traffic may be allowed (one example may be a change of the datarate, for example of the DigRF datarate, which may desire a resettling of the involved PLLs (phase-locked loops) and thus may desire a communication gap on the interface, for example on the DigRF Interface).

According to various embodiments, devices and methods may be provided wherein, in case no data is to be transmitted in a packet oriented link, both the transmitter and the receiver make a break in data transmission of a pre-determined number of packets. This may be provided by grouping the packets into sets of consecutive packets (in other words: into segments). As both the transmitter and the receiver are aware of the number of packets in a set, both the transmitter and the receiver know how long a break may take, and may keep synchronization, like will be described in more detail below.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

In various embodiments, a device may be a mobile radio communication device, for example an end-user mobile device (MD). In various embodiments, a mobile radio communication device may be any kind of mobile telephone, personal digital assistant, mobile computer, or any other mobile device configured for communication with a mobile communication base station (in other words: with a base station (BS)) or an access point (AP) and may be also referred to as a User Equipment (UE), a mobile station (MS) or an advanced mobile station (advanced MS, AMS), for example in accordance with IEEE 802.16m. A mobile radio communication device may also be referred to as a mobile terminal or as terminal device.

A device may include a memory which may for example be used in the processing carried out by the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

FIG. 1 shows a device 100 in accordance with an embodiment. The device 100 may include a data receiver 102 configured to receive data in sets of consecutive packets from a data transmitter (not shown in FIG. 1), wherein each set may include a first packet and at least one further packet. The device 100 may further include a first packet reception determinator 104 configured to determine whether the first packet of a set of consecutive packets is received by the data receiver 102. The device 100 may further include a data sending determinator 106 configured to determine whether the data transmitter sends the set of consecutive packets based on whether the first packet of the set of consecutive packets is received. The data receiver 102, the first packet reception determinator 104, and the data sending determinator 106 may be coupled with each other, e.g. via an electrical connection 108 such as e.g. a cable or a computer bus or fibre optics via any other suitable electrical or optical connection to exchange electrical or optical signals.

According to various embodiments, the data receiver 102 may be provided as a data receiving circuit. According to various embodiments, the first packet reception determinator 104 may be provided as a first packet reception circuit. According to various embodiments, the data sending determinator 106 may be provided as a data sending determination circuit.

According to various embodiments, the data receiver 102 may further be configured to receive the data from the data transmitter via an electrical line.

According to various embodiments, the data receiver 102 may further be configured to receive the data from the data transmitter wirelessly.

According to various embodiments, the first packet reception determinator 104 may further be configured to determine whether the first packet of a set of consecutive packets is received by the data receiver 102 based on whether the first packet of the set of consecutive packets is received by the data receiver 102 within a pre-determined time.

According to various embodiments, the pre-determined time may be a pre-determined time after a time of reception of a previous packet.

According to various embodiments, the data sending determinator 106 may further be configured to determine that the data transmitter sends the set of consecutive packets if the first packet reception determinator 104 determines that the first packet of the set of consecutive packets is received.

According to various embodiments, the data sending determinator 106 may further be configured to determine that the data transmitter does not send the set of consecutive packets if the first packet reception determinator 104 determines that the first packet of the set of consecutive packets is not received.

According to various embodiments, the data receiver 102 may further be configured to stop receiving data from the data transmitter if the data sending determinator 106 determines that the data transmitter does not send the set of consecutive packets.

According to various embodiments, the data receiver 102 may further be configured to keep a synchronization with the data transmitter if the data sending determinator 106 determines that the data transmitter does not send the set of consecutive packets.

According to various embodiments, the device 100 may further be configured to switch off at least one component of the device 100, the component configured to process received data, if the data sending determinator 106 determines that the data transmitter does not send the set of consecutive packets.

Figure 2:
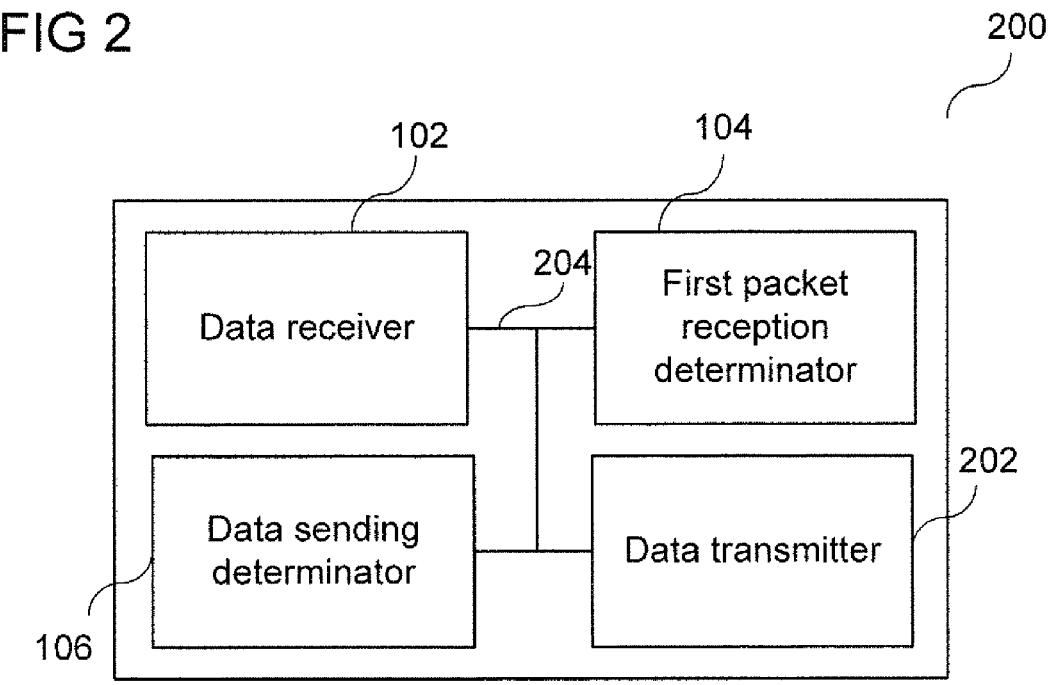
FIG. 2 shows a device in accordance with an embodiment.

FIG. 2 shows a device 200 in accordance with an embodiment. The device 200 may include, similar to the device 100 shown in FIG. 1, a data receiver 102. The device 200 may include, similar to the device 100 shown in FIG. 1, a first packet reception determinator 104. The device 200 may further include, similar to the device 100 shown in FIG. 1, a data sending determinator 106. The device 200 may further include the data transmitter 202. The data receiver 102, the first packet reception determinator 104, the data sending determinator 106, and the data transmitter 202 may be coupled with each other, e.g. via an electrical connection 204 such as e.g. a cable or a computer bus or fibre optics via any other suitable electrical or optical connection to exchange electrical or optical signals.

According to various embodiments, the data transmitter 202 may be provided as a data transmitting circuit.

According to various embodiments, the device 200 may be a mobile radio communication device.

According to various embodiments, the device 200 may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface.

According to various embodiments, at least one of the data receiver 102 and the data transmitter 202 may include (or may be provided to be used for data reception or transmission by) a chip configured to process data related to wireless transmission of the mobile radio communication device.

According to various embodiments, the data receiver 102 may include or may be a baseband chip and the data transmitter 202 may include or may be a radio frequency transceiver chip.

According to various embodiments, the data receiver 102 may include or may be a radio frequency transceiver chip and the data transmitter 202 may include or may be a baseband chip.

FIG. 3 shows a flow diagram 300 illustrating a method in accordance with an embodiment. In 302, data may be received in sets of consecutive packets from a data transmitter, wherein each set may include a first packet and at least one further packet. In 304, it may be determined whether the first packet of a set of consecutive packets is received. In 306, it may be determined whether the data transmitter sends the set of consecutive packets based on whether the first packet of the set of consecutive packets is received.

According to various embodiments, the data may be received from the data transmitter via an electrical line.

According to various embodiments, the data may be received from the data transmitter wirelessly.

According to various embodiments, it may be determined whether the first packet of a set of consecutive packets is received based on whether the first packet of the set of consecutive packets is received within a pre-determined time.

According to various embodiments, the pre-determined time may be a pre-determined time after a time of reception of a previous packet.

According to various embodiments, it may be determined that the data transmitter sends the set of consecutive packets if it is determined that the first packet of the set of consecutive packets is received.

According to various embodiments, it may be determined that the data transmitter does not send the set of consecutive packets if it is determined that the first packet of the set of consecutive packets is not received.

According to various embodiments, receiving data from the data transmitter may be stopped if it is determined that the data transmitter does not send the set of consecutive packets.

According to various embodiments, a synchronization with the data transmitter may be kept if it is determined that the data transmitter does not send the set of consecutive packets.

According to various at least one component configured to process received data may be switched off, if it is determined that the data transmitter does not send the set of consecutive packets.

According to various embodiments, the method may be performed in a device (for example device 100 shown in FIG. 1 or device 200 shown in FIG. 2), in which a data receiver receiving the data from the data transmitter and the data transmitter are provided.

According to various embodiments, the device may be a mobile radio communication device.

According to various embodiments, the device may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), TD-LTE, Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface.

According to various embodiments, at least one of the data receiver and the data transmitter may include (or may be provided to be used for data reception or transmission by) a chip configured to process data related to wireless transmission of the mobile radio communication device.

According to various embodiments, the data receiver may include or may be a baseband chip and the data transmitter may include or may be a radio frequency transceiver chip.

According to various embodiments, the data receiver may include or may be a radio frequency transceiver chip and the data transmitter may include or may be a baseband chip.

FIG. 4 shows a device 400 in accordance with an embodiment. The device 400 may include a data sending determinator 402 configured to determine whether a data transmitter sends a set of consecutive packets, wherein each set may include a first packet and at least one further packet, based on whether the first packet of the set of consecutive packets is received by the device.

FIG. 5 shows a flow diagram 500 illustrating a method in accordance with an embodiment. In 502, it may be determined whether a data transmitter sends a set of consecutive packets, each set comprising a first packet and at least one further packet, based on whether the first packet of the set of consecutive packets is received.

According to various embodiments, in a communication system, the interface between a transmitter and a receiver, for example between a baseband chip and a rf (radio frequency) transceiver chip, may be based on a packet oriented link. For example, devices and methods may be provided for a communication in line with the MIPI Alliance Specification for DigRF5NI v4.

According to various embodiments, in contrast to previous IQ (In-phase/Quadrature) datainterfaces, which may have been based on an equidistant sample stream, the DigRF standard may provide logical channels for the IQ samples. A logical channel may be implemented by a packet containing a header and a payload. The header may carry an identifier for the logical channel type. Data and control logical channels may be distinguished by the logical channel type. The payload of a data packet may carry a defined number of IQ samples.

According to various embodiments, all logical channel types may be multiplexed onto the same physical link. An arbiter may be responsible to prioritize between the different transfer requests. Due to the arbitration procedure, usually packets may have a variable latency.

As a consequence, a control packet for the rf transceiver may have a limited accuracy in time. To increase the accuracy, a special time accurate strobe packet (TAS packet) may be defined, for example like defined by the DigRF standard.

Anyhow, even the accuracy of a TAS packet may not always be the desired choice to control the timing of the sampling in the transceiver. An example may be the restart of the WCDMA IQ sample stream in a 3GPP system e.g. after a measurement gap used for example for GSM measurements.

According to various embodiments, devices and methods may be provided to recover the timing of a sample stream (or a packet stream) after a gap without the need to send additional TAS packets with high accuracy.

According to various embodiments, devices and methods may be provided that allow to replace a dummy stream by a communication GAP (for example in cases no data is to be transmitted). According to various embodiments, the dummy stream may be kept alive in the transceiver and the baseband. According to various embodiments, devices and methods may be provided which allow to reconstruct an accurate stream timing and/or to synchronize the baseband and transceiver even after communication gaps. According to various embodiments, an alignment may be provided between the baseband and the transceiver.

According to various embodiments, a datastream, for example a datastream on the digRF bus, may be divided into segments. The size of a segment may be a defined number of packets (for example an integer number_of_packets_ per_segment), where every packet may include the same number of samples, for example an integer n. Thus, the total number of samples in a segment may be $$\text{number\_of\_samples\_per\_segment} = \text{number\_of\_packets\_per\_segment} \cdot n.$$

Both the data transmitter and the data receiver, for example both the transceiver and the baseband, may know the value of number_of_samples_per_segment.

According to various embodiments, when the data transmitter, for example transceiver, starts a transmission gap towards the data receiver, for example towards the baseband, it may always skip an integer number of segments. According to various embodiments, the device in which the data receiver is provided, for example the receiving baseband, may perform the following three tasks:

a) Identify the start of a gap: The gap length may be determined by the parameter number_of_samples_per_segment or number_of_packets_per_segment. The gap length may be chosen in a way that there is no risk for a false alarm gap detection. Thus the gap length may be larger than the expected packet jitter due to latency caused by packet arbitration and/or retransmission effects. According to various embodiments, a gap may be detected (in other words: it may be determined that the data transmitter does not send the segment; in other words: it may be determined that the data transmitter does not send the set of consecutive packets), for example based on a read pulse of a read counter; this may provide that in a case where the data transmitter and the data receiver have agreed on a sampling rate, the gap detection may be provided independent from the agreed sampling rate.

b) When the device including the data receiver, for example the baseband, identifies (in other words: determines) a gap, it may know that a multiple number of numbers_of_samples_per_segment samples (or a multiple number of number_of_packets_per_sample packets) will be skipped. With the detection of the gap, it may insert number_of_samples_per_segment samples in its internal dummy sample stream (for example the internal dummy sample stream may be kept alive during this gap). Every number_of_samples_per_segment dummy samples another number_of_samples_per_segment may be inserted. This procedure may continue until the next packet (first packet after gap) is received.

c) The gap may end when the next packet (first packet after a gap) is received from the data transmitter, for example the transceiver.

According to various embodiments, the devices and methods described above may also be applied for transmit direction, for example for transmission from a baseband to a transceiver.

In the following, a more detailed description of devices and methods showing the basic idea and a baseband implementation according to various embodiments will be described.

Various devices and methods may be referred to as devices and methods for a timing recovery mode.

Figure 6:
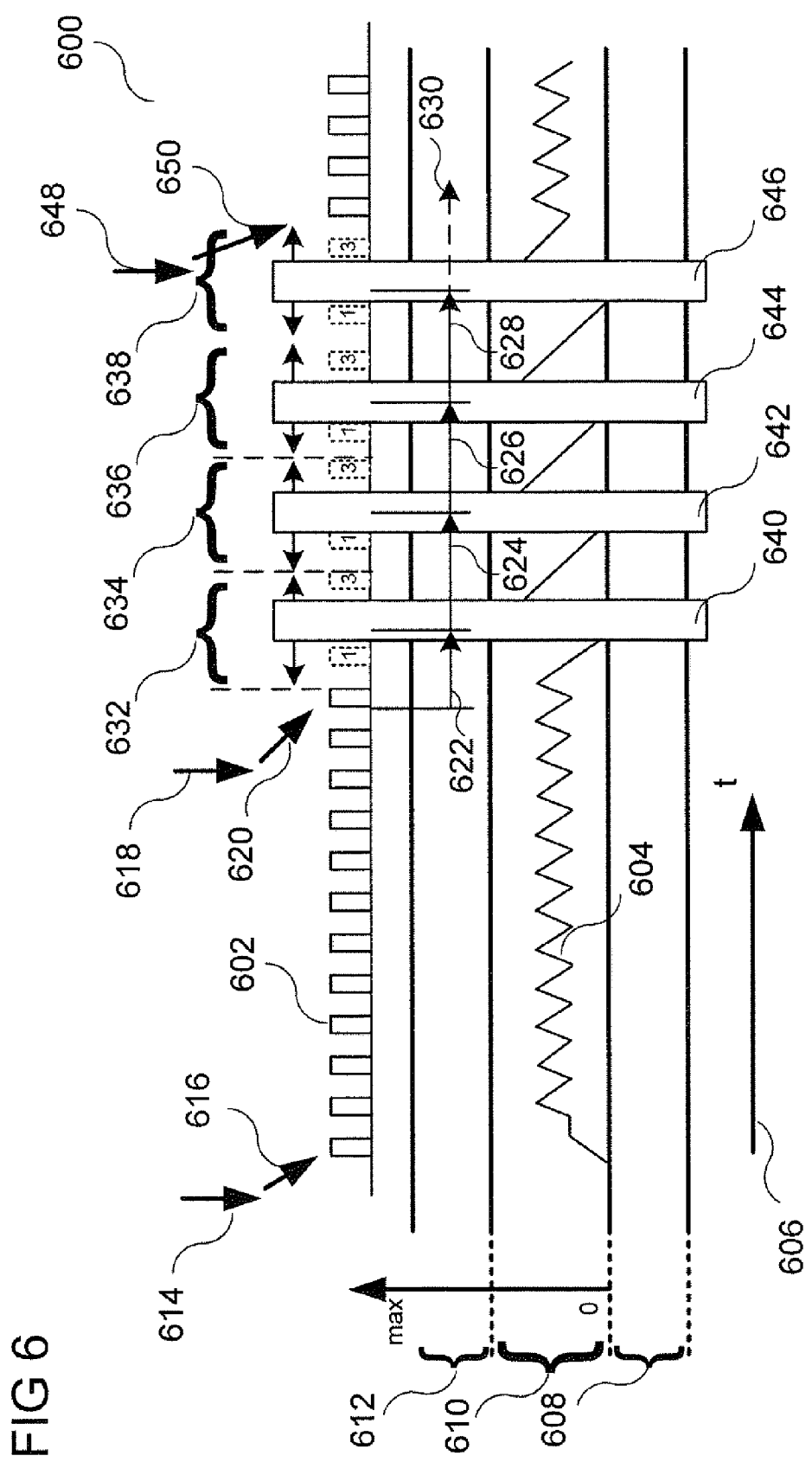
FIG. 6 shows a flow diagram illustrating a method in accordance with an embodiment.

FIG. 6 shows a flow diagram 600 illustrating a method in accordance with an embodiment. Received packets 602 are shown over a time axis 606. For example, sending of packets from a data transmitter may be initiated by a data transmitter switch on message 614. After a processing delay, first packets may be received in a data receiver, like indicated by arrow 616. A fill level of a first-in-first-out (FIFO) buffer 604, for example a baseband FIFO fill buffer, and a corresponding FIFO underflow range 608, a FIFO operating range 610, and a FIFO overflow range 612 are shown.

According to various embodiments, in the context of the timing recovery mode, it may be desired to maintain a consistent FIFO pointer arithmetic (write and read pointer) even in the underflow/overflow area. As a consequence the FIFO fill level may have negative values.

According to various embodiments, a gap may be initiated by a data transmitter switch off message 618. After a processing delay, the data transmitter, for example the rf transceiver, may stop sending packets, for example may stop the 3G data stream, like indicated by arrow 620, until the stream is reactivated by a data transmitter switch on message 648 (which may also be delay due to processing delay and waiting until skipping of packets is complete, like indicated by arrow 650). There may be no hard timing requirements for the data receiver, for example the baseband, in positioning the messages. After a data transmitter switch on command, the data transmitter, for example the rf transceiver, may be responsible to extend the gap that it is a multiple of n (for example n equals three) data packets. Every group of n (for example three) packets may be called a set of consecutive packets or a segment. For example, a first segment 632, a second segment 634, a third segment 636 and a fourth segment 638 may be provided. The gap may be divided into a sequence of segments of equal length in multiple of packets. The packets that are not transmitted and not received (i.e. the position where packets would be received in normal operation, but are not present due to a gap) are shown in dashed lines and numbered with the respective packet number in the set of consecutive packets. In the example shown in FIG. 6, a set or segment may include three packets.

According to various embodiments, an automatic gap detection may be provided, for example in a data wrapper. According to various embodiments, with every packet, for example with every 3G data packet, a counter may be started or restarted at the beginning of the reception of a packet, for example at the beginning of a DLC (data logic channel) packet. The counter may increment with a sample clock (for example with sample clock pulses), for example at the read interface of the wrapper. When the counter exceeds a predetermined threshold, for example a programmable threshold, the FIFO fill level may be adjusted by adding number of samples per segment to the FIFO write pointer. Starting with this point after every number_of_samples_per_segment pulses at the read interface, the write pointer may be adjusted by number_of_samples_per_segment samples. This procedure may continue until the first packet, for example 3G data packet, for example for a corresponding cell, is received after the gap. With the reception of the first packet after the gap, the datastream may continue.

For example, the data receiver, for example the baseband, may do the write pointer correction during a first correction period 640 during the first segment 632, and during a second correction period 642 during the second segment 634, and during a third correction period 644 during the third segment 636, and during a fourth correction period 646 during the fourth segment 638. According to various embodiments, a correction period may be provided in the middle of a gap segment. According to various embodiments, the packet distance may be measured in units of read samples, and counting read samples via a dedicated counter may be provided to measure the distance, wherein the gap segment may be allocated based on the distance. Alternatively, the fill level of the FIFO may be used for this purpose. For visualization purposes, a packet distance monitoring via a dedicated counter may be sufficient.

It will be understood that the number of segments (in other words: the number of sets of consecutive packets) and the number of correction periods depends on the length of the gap.

According to various embodiments, after a pre-determined time 622 after reception of the previous packet, it may be determined that the first packet of the set of consecutive packets is not received.

According to various embodiments, the second correction period 642 may be provided a pre-determined time 624, for example corresponding to a time that would be required to receive number_of_samples_per_segment samples, or a time that would be required to receive number_of_packets_per_segment packets, after the first correction period 640. Likewise, the third correction period 644 may be provided a pre-determined time 626 after the second correction period 642. Likewise, the fourth correction period 646 may be provided a pre-determined time 628 after the third correction period 644. Likewise, a further correction period would be provided a pre-determined time 630 after the fourth correction period 646, in case data reception would not have been re-started after the fourth correction period 646.

According to various embodiments, the segmentation of the gap into equal-sized segments may provide that the first received packet, for example the first 3G receive packet, after the gap does not collide with the preceding adjustment of the write pointer.

According to various embodiments, the first packet after a gap may set the data receiver, for example the baseband, to normal operation. According to various embodiments, no further correction may be done by the data receiver, for example the baseband. According to various embodiments, the position may be "far away" from the correction periods in the data receiver. According to various embodiments, the total gap length may be a multiple of n packets.

Figure 7:
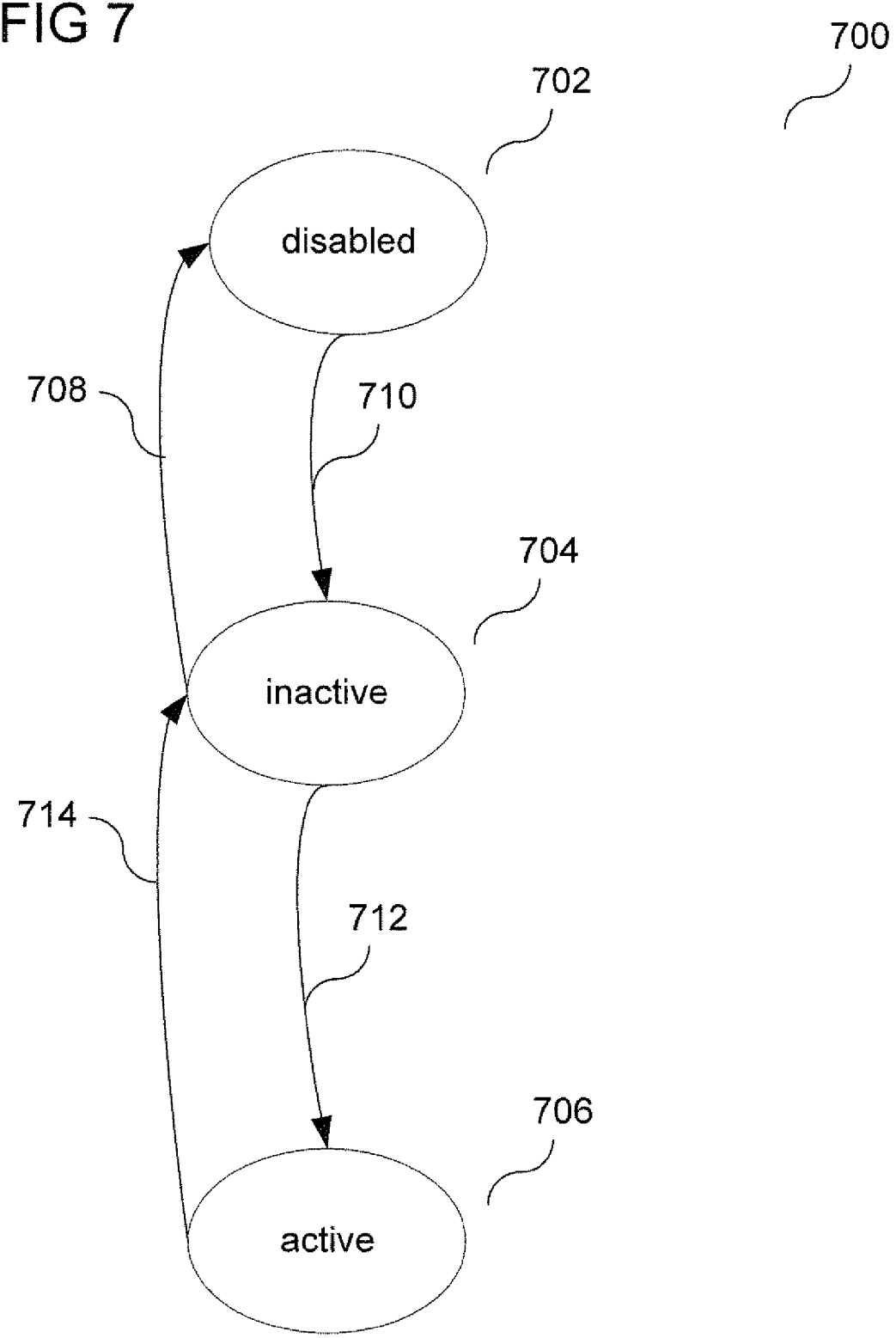
FIG. 7 shows a state diagram illustrating a method in accordance with an embodiment.

FIG. 7 shows a state diagram 700 illustrating a method in accordance with an embodiment. Three states may be provided. In a disabled state 702, the method according to various embodiments may not be in operation. In an inactive state 704, the method according to various embodiments may be in operation, and it may be determined that the first packet in the set of consecutive packets is received. In an active state 706, the method according to various embodiments may be in operation, and it may be determined that the first packet in the set of consecutive packets is not received.

A transition condition 708 for transiting from the inactive state 704 to the disabled state 702 may be that a flag for enabling the method is set to a disabled value, for example to zero.

A transition condition 710 for transiting from the disabled state 702 to the inactive state 704 may be that the flag for enabling the method is set to an enabled value, for example to one.

Upon entry into the inactive state 704, a pulse counter may be set to an initial pulse counter value, for example to zero.

In the inactive state 704, an inactive loop may be executed.

In every loop in the inactive state 704, it may be checked whether the flag for enabling the method is set to the disabled value, and in case the flag for enabling the method is set to the disabled value, the loop may be exited. Furthermore, in every loop in the inactive state 704, if a pulse is determined, the pulse counter may be increased, for example by one. Furthermore, in every loop in the inactive state 704, it may be determined whether a packet is received, and in case a packet is received, the pulse counter is set to the initial pulse counter value. Furthermore, in every loop in the inactive state 704, it may be determined whether the loop counter exceeds a pre-determined first threshold (which may be referred to as gap threshold), and in case it is determined that the loop counter exceeds the pre-determined gap threshold, a pre-determined value, for example number_of_samples_per_segment, is added to the FIFO writer pointer, and the loop is exited.

According to various embodiments, packets may be data packets received for a cell. For example, a first type of packets may include packets for a primary antenna, and a second type of packets may include packets received from a diversity antenna in case that antenna diversity is active. According to various embodiments, in diversity operation, a dedicated data logical channel identifier may be assigned to every antenna. According to various embodiments, the devices and methods may be cell specific and not antenna specific.

A transition condition 712 for transiting from the inactive state 704 to the active state 706 may be that the pulse counter exceeds the pre-determined gap threshold.

Upon entry into the active state 706, the pulse counter may be set to the initial pulse counter value.

In the active state 706, an active loop may be executed.

In every loop in the active state 706, it may be checked whether the flag for enabling the method is set to the disabled value, and in case the flag for enabling the method is set to the disabled value, the loop may be exited. Furthermore, in every loop in the active state 706, if a pulse is determined, the pulse counter may be increased, for example by one. Furthermore, in every loop in the active state 706, it may be determined whether the loop counter exceeds a pre-determined second threshold (which may for example be number_of_samples_per_segment), and in case it is determined that the loop counter exceeds the second threshold, the pulse counter may be set to the initial pulse counter value and a pre-determined value, for example number_of_samples_per_segment, may be added to the FIFO writer pointer.

A transition condition 714 for transiting from the active state 706 to the inactive state 704 may be that a packet is received.

FIG. 8 shows a diagram 800 illustrating a method in accordance with an embodiment. Various data already described above with respect to FIG. 7 are shown. Time is assumed to proceed from left to right in FIG. 8. The flag 802 for enabling the method may be switched at a point of time 816 from the disabled value to the enabled value. The clock pulse 804 is shown. The pulse counter 804 starts counting after the flag is set to the enabled value. The gap threshold 808 is shown, for example with a value of 7. The value of number_of_samples_per_segment 812 is shown, for example with a value of 16. The write pointer 812 is shown, like will be described in more detail below. The state 814 of the method is shown, for example as disabled 846 until the switching point 816, inactive 848 and active 850, like will be described in more detail below.

As an example, for the start of the example shown in FIG. 8, the write pointer is assumed to have a value of 17 (which is any integer number that the write pointer may have at the start of the example), like shown in field 830.

For example, a packet may be received, like indicated by arrow 818. As a consequence, the clock counter 806 may be reset to the initial clock counter value, for example to zero. Furthermore, like indicated by arrow 822, the write pointer 812 may be increased by the number of samples per packet, which for this example may be assumed to be four, like indicated by field 832, so that an overall value of 21 may be present, like indicated by field 834. For example, a further packet may be received, like indicated by arrow 820. As a consequence, the clock counter 806 may be reset to the initial clock counter value, for example to zero. Furthermore, like indicated by arrow 824, the write pointer 812 may be increased by the number of samples per packet, like indicated by field 836, so that an overall value of 25 may be present, like indicated by field 838.

After each received packet, the pulse counter 806 may be increased, for example by one, with every pulse 804. After the pulse counter 806 reaches the value of the gap threshold (for example 7), the state may change from inactive to active, like indicated by arrows 826 and 840, and field 850. As a consequence, the write pointer 812 may be increased by the value of number_of_samples_per_segment 810, like indicated by field 842.

Furthermore, in the active state, after the pulse counter 802 reaches the value of number_of_samples_per_segment 810, like indicated by arrow 828, the write pointer may be increased by number_of_samples_per_segment, like indicated by field 844.

According to various embodiments, the TRM mode may be desired to be enabled via the TRM Bits in a pre-determined register. For every cell, a dedicated TRM bit may be available. If the TRM is enabled the corresponding TRM, the finite state machine may change to the TRM inactive state where it waits for a transmission gap. When a transmission gap is detected the TRM, the finite state machine may change to the TRM active state. An automatic update of the FIFO write pointer may be triggered by the TRM finite state machine after programmable periods. When the first packet, for example 3G packet, is received after a gap, the TRM finite state machine (FSM) may return to the TRM inactive state. Dedicated TRM FSMs may be available for the primary cell and the secondary cell. They may be controlled independent from each other. The gap threshold parameter and the number_of_samples_per_segment parameter may be the same for both cells. It may be configured in a pre-determined register.

The actual state of the TRM FSM may be read from pre-determined registers.

It will be understood that in the TRM mode, negative FIFO values may occur. In the context of the TRM mode, this may be not an error condition. Thus, in the TRM enabled states, FIFO overflow and FIFO underflow errors may be suppressed.

The devices and methods according to various embodiments may be extended to more than one datastream. If there is a correlation between the packets for both the datastreams (for example in case there is a relation that packets of a first datastream and packets of a second datastream are always neighbour packets) this extensionis may be provided.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A device comprising:
   a data receiver configured to receive data in sets of consecutive packets from a data transmitter, each set comprising a first packet and at least one further packet;
   a first packet reception determinator configured to determine whether the first packet of a set of consecutive packets is received by the data receiver; and
   a data sending determinator configured to determine whether the data transmitter sends the set of consecutive packets based on whether the first packet of the set of consecutive packets is received, wherein the data sending determinator is further configured to determine that the data transmitter does not send the set of consecutive packets if the first packet reception determinator determines that the first packet of the set of consecutive packets is not received.

2. The device of claim 1, wherein the data receiver is further configured to receive the data from the data transmitter via an electrical line.

3. The device of claim 1, wherein the data receiver is further configured to receive the data from the data transmitter wirelessly.

4. The device of claim 1, wherein the first packet reception determinator is further configured to determine whether the first packet of a set of consecutive packets is received by the data receiver based on whether the first packet of the set of consecutive packets is received by the data receiver within a pre-determined time.

5. The device of claim 4, wherein the pre-determined time is a pre-determined time after a time of reception of a previous packet.

6. The device of claim 1, wherein the data sending determinator is further configured to determine that the data transmitter sends the set of consecutive packets if the first packet reception determinator determines that the first packet of the set of consecutive packets is received.

7. The device of claim 1, wherein the data receiver is further configured to stop receiving data from the data transmitter if the data sending determinator determines that the data transmitter does not send the set of consecutive packets.

8. The device of claim 7, wherein the data receiver is further configured to keep a synchronization with the data transmitter if the data sending determinator determines that the data transmitter does not send the set of consecutive packets.

9. The device of claim 8, wherein said synchronization comprises an automatic gap detection provided in a data wrapper.

10. The device of claim 9, wherein said synchronization further comprises a pulse counter that starts upon reception of a packet.

11. The device of claim 10, wherein the pulse counter is restarted upon reception of a data packet and incremented upon a clock pulse.

12. The device of claim 11, wherein the data receiver is further configured to enter an active state when the pulse counter equals a previously-determined threshold.

13. The device of claim 9, wherein the data receiver is further configured so that, upon the gap detection, at least one of a multiple number of packets or a multiple number of packets will be reconstructed with dummy samples.

14. The device of claim 13, wherein the detected gap ends upon reception of a data packet from a data transmitter.

15. The device of claim 8, wherein reception of a packet triggers entry into an inactive state.

16. The device of claim 1, further comprising: the data transmitter.

17. The device of claim 16, wherein the device is a mobile radio communication device.

18. The device of claim 17, wherein at least one of the data receiver and the data transmitter comprises a chip configured to process data related to wireless transmission of the mobile radio communication device.

19. The device of claim 17, wherein the data receiver comprises a baseband chip and the data transmitter comprises a radio frequency transceiver chip.

20. The device of claim 17, wherein the data receiver comprises a radio frequency transceiver chip and the data transmitter comprises a baseband chip.

21. A method comprising:
   receiving data in sets of consecutive packets from a data transmitter, each set comprising a first packet and at least one further packet;
   determining whether the first packet of a set of consecutive packets is received; and
   determining whether the data transmitter sends the set of consecutive packets based on whether the first packet of the set of consecutive packets is received
   wherein it is determined that the data transmitter does not send the set of consecutive packets if it is determined that the first packet of the set of consecutive packets is not received.

22. The method of claim 21, wherein the data is received from the data transmitter via an electrical line.

23. The method of claim 21, wherein the data is received from the data transmitter wirelessly.

24. The method of claim 21, wherein it is determined whether the first packet of a set of consecutive packets is received based on whether the first packet of the set of consecutive packets is received within a pre-determined time.

25. The method of claim 24, wherein the pre-determined time is a pre-determined time after a time of reception of a previous packet.

26. The method of claim 21, wherein it is determined that the data transmitter sends the set of consecutive packets if it is determined that the first packet of the set of consecutive packets is received.

27. The method of claim 21, wherein receiving data from the data transmitter is stopped if it is determined that the data transmitter does not send the set of consecutive packets.

28. The method of claim 27, wherein a synchronization with the data transmitter is kept if it is determined that the data transmitter does not send the set of consecutive packets.

29. A device comprising:
   a data sending determinator configured to determine whether a data transmitter sends a set of consecutive packets, each set comprising a first packet and at least one further packet, based on whether the first packet of the set of consecutive packets is received by the device wherein the data sending determinator determines that the data transmitter does not send the set of consecutive packets if the first packet of the set of consecutive packets is not received.

30. A method comprising:

determining, by a data sending determinator, whether a data transmitter sends a set of consecutive packets, each set comprising a first packet and at least one further packet, based on whether the first packet of the set of consecutive packets is received, wherein it is determined that the data transmitter does not send the set of consecutive packets if it is determined that the first packet of the set of consecutive packets is not received.

* * * * *